June 2, 1959   J. KATZEN ET AL   2,888,869
REMOTELY CONTROLLED POSITIVE INDEXING LENS TURRET FOR CAMERAS
Filed Aug. 13, 1954
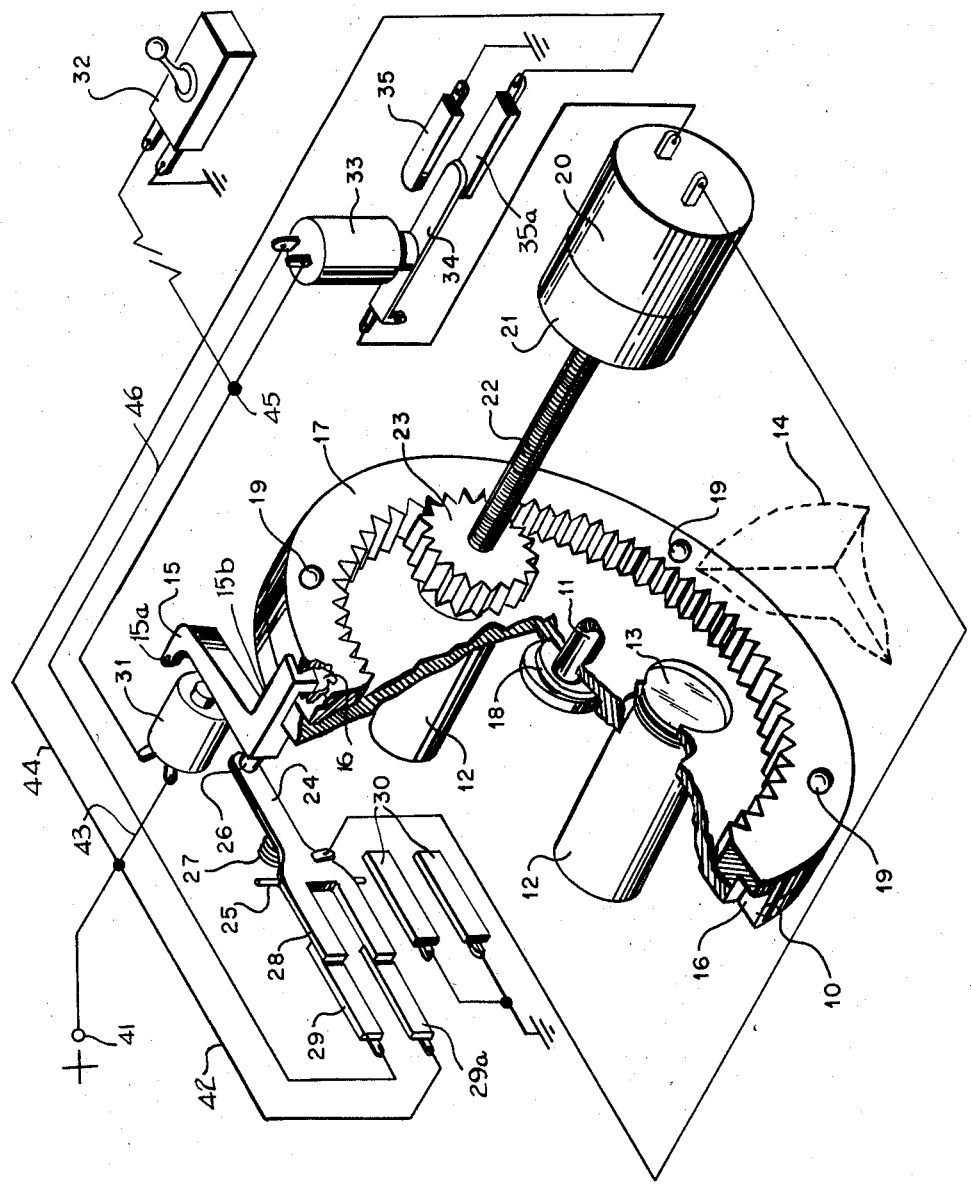
INVENTORS
JACOB KATZEN
ARCHIE GOLD
BY
M. F. Ross
ATTORNEYS

United States Patent Office

2,888,869
Patented June 2, 1959

2,888,869
REMOTELY CONTROLLED POSITIVE INDEXING LENS TURRET FOR CAMERAS

Jacob Katzen and Archie Gold, Philadelphia, Pa., assignors to the United States of America as represented by the Secretary of the Navy Application August 13, 1954, Serial No. 449,809

6 Claims. (Cl. 95—45)

(Granted under Title 35, U.S. Code (1952), sec. 266)

The invention described herein may be manufactured and used by or for the Government of the United States of America for governmental purposes without the payment of royalties thereon or therefor.

This invention relates to indexing apparatus, more particularly, it relates to apparatus for selectively positioning lenses of a television camera in various operative positions.

In the photographic and television art the problem of taking pictures in rapid succession using lenses of varying focal length has been solved by mounting the lenses in a rotatable turret designed for selectively positioning the required lens in front of the entrance window of the camera. The general design of the turret, the method of mounting it and its operation with respect to the operating mechanism of the camera, as well as proper positioning with respect to the entrance window are illustrated by commercial devices available. Examples of these constructions are disclosed in U.S. Patent Nos. 1,893,327 and 2,635,514.

Prior art devices for positioning the camera lenses with respect to the entrance window of the camera are subject to certain disadvantages. Those which are manually operated, are unsuitable for taking photographs in rapid succession. The locking camera turrets of the prior art are not self-locking and their construction does not permit positive locking. As a result, photographs are unsatisfactory when taken under conditions of excessive and severe vibration because of relative motion between lens and camera. Another disadvantage of prior art indexing devices is the fact that they are not remotely and automatically controlled. They are subject to the further disadvantage that the unlocking mechanism provided is not always dependable, and in those devices which are power operated, high power is required, thus resulting in undesirable size of components as well as excessive drain on the power source.

The present invention overcomes the disadvantages of previous turret arrangements by providing for a rotatable turret disc mounting a plurality of selected lenses and for a novel positioning mechanism which, upon manual switching, quickly and positively rotates the disc to move the next lens into alignment with the camera aperture. The mechanism also includes a novel locking arrangement for insuring, in the first instance, proper initial alignment of the lens and in the second instance, positive clamping of the lens in position at all times permitting the turret assembly to be adequately protected from local vibration and other conditions tending to cause misalignment of the lens and camera opening.

It is, therefore, an object of this invention to provide a compact, remotely controlled, power operated, indexing turret for cameras.

It is another object of this invention to provide an indexing turret which can be positively locked in the indexing positions and which has a dependable unlocking mechanism.

It is a further object of this invention to provide an indexing turret mechanism for cameras which is operable on low power and which is characterized by components which are small and inherently compact.

It is a still further object of this invention to provide indexing apparatus for positioning a movable device in selective positions with respect to a stationary device, which locks positively in the indexed positions, has dependable unlocking features, and can be operated on low power.

The invention is best understood by reference to the accompanying drawing which is an isometric pictorial view of one embodiment of the invention, showing a lens turret in one of the three index positions with respect to the entrance window of a camera. In the drawing, the numeral 10 designates a turret plate mounted to rotate on shaft 11. The turret plate supports a plurality of lenses 12 provided with lens apertures 13. When the lens is in its index position it is directly opposite the entrance window of the camera (not illustrated). The synchronization of the camera film with the lens turret to insure the pickup of the image for television purposes or that unexposed film is available for exposure in photographic applications, is accomplished by conventional means such as those disclosed in the above referred to U.S. patents. The components of the locking feature of the device of the invention, as well as the elements for driving the lens turret, are described as follows:

A detent lever 15 is adapted to fit into detents 16 of the turret plate to hold it in an indexed position. Lever 15 is pivoted at 15a permitting the free end 15b to slide transversely in and out of detent or slot 16. An internal ring gear 17 is secured to turret plate 10, or made integral therewith, and the turret plate and ring gear are held in rotatable relationship with the camera face by means of pressure from spring washer 18 and through the medium of rotatable steel balls 19 which are embedded in the face of camera 14. Other conventional arrangements may be used for securing relative motion between the turret plate and the camera. The turret plate is rotated to the various indexed positions by means of a conventional, reversibly operating motor 20 to an irreversible gear reduction train 21, spring shaft 22 and driven pinion 23. By irreversible is meant, as is understood in the art, that gear train 21, in having a high numerical mechanical advantage, will inherently permit power flow from one end of the gear train to the other only, although the rotation itself may be in either way. Hence, irreversible gear reduction train 21 prevents the tension in spring shaft 22 from being transmitted to motor 20 causing the latter's rotation. In the drawing the indexing mechanism is shown in the locked position. The sequence of operations by which it is unlocked, moved to the following indexed position and locked is described as follows:

Unlocking of the turret is accomplished by releasing the pressure of spring shaft 22 by reversing the motor, followed by removal of detent lever 15 from the detent 16. Contact member 24 is pivotally mounted at 25 as shown and one of its ends is spring pressed by means of spring 27 against the back of detent lever 15 to hold it in detent 16 when in the locked position, and against the face of turret plate 10 while the turret plate is traveling between indexed positions. The other end 28 of contact member 24 is adapted to move between contacts 29 and 30 as detent lever 15 is moved in and out of detent 16.

For removing detent lever 15 from detent 16, after release of the pressure caused by spring shaft 22 on the detent lever, and to accomplish proper cycling of the system when switch 32 is closed and opened manually, a simple electrical arrangement is provided. A source of voltage is applied to lead 41. Conductors 42, 43 and 44 deliver the positive voltage to contact 29a, solenoid 31 and contact 35a, respectively. A solenoid 31 is connected in parallel with solenoid 33 since point 45 between the two solenoids is connected to switch 32 to the ground. The contact of solenoid 33 opposite point 45 is connected to the positive voltage source through conductor 46, contact 29, movable contact 28, contact 29a, conductor 42, and lead 41. Reversible motor 20 is connected electrically between movable contact 34 of solenoid 33 and movable contact 28. Contact 34 is normally in contact with element 35a when solenoid 33 is deenergized, and in contact with element 35 to ground when energized. Movable element 24 is turned into contact with contacts 29 and 29a when solenoid 31 is deenergized, and into contact with elements 30 to ground when energized.

Thus, when switch 32 is closed, solenoids 31 and 33 are energized, the latter for an instant, until movable contact 28 breaks connection with contacts 29 and 29a. This causes a momentary reversal of motor 20 due to temporary contact between elements 34 and 35 permitting detent lever 15 to be loosened in detent 16 from the shoulder jammed against it.

In operation, to advance the turret plate to the next indexing position the remote control switch 32 is closed, thereby activating solenoid 31 and simultaneously activating relay 33 through the connection formed by the end 28 of contact member 24 and contact point 29. Activating relay 33 energizes the motor 20 for rotation in reverse for an instant to release the pressure on detent lever 15 by unwinding spring shaft 22. When the pressure is released on detent lever 15 the attraction of activated solenoid 31 is sufficient to remove detent lever 15 from detent 16, thereby switching the end 28 of contact member 24 to contact 30, thus dropping out relay 33 and reversing the motor. The remote control switch 32 is then opened by the operator, the turret continuing to rotate forwardly to the next indexing position with detent lever 15 riding on turret plate 10 under pressure of spring 27. When the turret reaches the next indexing position, detent lever 15 drops into the corresponding detent 16 and thus end 28 of contact member 24 is switched back to contact 29 to switch off the motor. However, due to the motor's inertia, it continues to rotate until halted by the tension in spring shaft 22 developed by angular displacement of one end of the shaft by terminal rotation of the motor 20, that is the rotation of the motor 20, due to its inertia, after the turret plate 10 has been immobilized by engagement of the detent lever 15 with a detent 16 therein. Due to the irreversible feature of the motor it cannot be driven by the spring shaft through the irreversible gear train so that the turret plate is positively locked.

The turret indexing mechanism was found to be highly successful for high speed camera operations. The spring shaft forms a resilient locking mechanism which positively locks the turret and at the same time reduces shock on the camera such as would result from a sudden stoppage which would result if a rigid connecting element were used between the motor and the indexing device. The use of an irreversible motor and gear train prevents the slightest movement of the indexing mechanism from the indexed position. The specific construction of the various elements of the indexing device lend themselves to assembly into a rigid compact device occupying a relatively small amount of space. The device is conveniently operated by a low power source. The elements and their arrangement for locking and unlocking a device together with the accompanying circuity is such that locking occurs automatically, and unlocking of the device is accomplished instantaneously upon closing of the remote control switch 32. Television operations were conducted in aircraft with the device in operation without interference due to relative movement of the camera and lens. Positive indexing action was obtained under all conditions of severe aircraft accelerations.

Although the invention has been described and illustrated in connection with its application to an indexing lens turret for cameras, it is by no means limited to this application. As will be obvious to those skilled in the art, the invention is adaptable to a wide number of applications wherein it is necessary to accurately position one element with respect to another.

Various modifications in the device itself are of course feasible. For example, the connecting link between the motor and the driven pinion is not restricted to a spring shaft but may take many other forms of a resilient connection. Other modifications within the scope of the appended claims will be apparent to those skilled in the art.

Obviously, many modifications and variations of the present invention are possible in the light of the above teachings. It is therefore to be understood that within the scope of the appended claims the invention may be practiced otherwise than as specifically described.

What is claimed is:

1. Camera apparatus comprising a housing having an aperture, a turret carrying a plurality of lenses mounted for rotation with respect to said housing and permitting alignment in sequence of said lenses with said aperture as said turret is rotated, means holding said turret in any one of a plurality of positions, each position aligning a lens with said aperture, means for locking said holding means against release, motor means to rotate said turret between positions, switch means, and means responsive to closing of said switch means for successively momentarily reversing said motor means to release said locking means, releasing said holding means, and energizing said motor means to rotate said turret to the next position where said holding means automatically hold said turret, said locking means comprising irreversible gearing and a flexible shaft between said motor means and said turret for absorbing the inertia of said motor means when said holding means stops rotation of said turret in said next position, said shaft thereby locking in a positive manner said turret against movement.

2. Camera apparatus comprising a housing having an aperture, a turret carrying a plurality of lenses mounted for rotation with respect to said housing and permitting alignment in sequence of said lenses with said aperture as said turret is rotated, means for stopping and holding said turret in any one of a plurality of positions, each position aligning a lens with said aperture, motor means rotating said turret between positions, and drive means between said motor means and said turret including irreversible gearing connected to said motor means and a flexible shaft between said gearing and said turret for absorbing the inertia of said motor means when said stopping and holding means stops rotation of said turret in one of said positions, said shaft thereby locking in a positive manner said turret against movement.

3. Camera apparatus comprising a housing having an aperture, a turret carrying a plurality of lenses mounted for movement with respect to said housing and permitting alignment in sequence of said lenses with said aperture as said turret is moved, means for stopping and holding said turret in any one of a plurality of positions, each position aligning a lens with said aperture, motor means to move said turret between said positions, said stopping and holding means comprising a plurality of slots spaced on said turret, one for each of said lens positions, a catch sliding on said turret biased into engagement with said slots for stopping turret movement when engaged with one of the said slots, and drive means between said motor means and said turret including irreversible gearing connected to said motor means and a flexible shaft between said gearing and said turret for absorbing the inertia of said motor means when said catch drops into one of said slots stopping movement of said turret, said shaft, due to energy stored therein, locking in a positive manner said turret against said catch.

4. Camera apparatus comprising a housing having an aperture, a turret carrying a plurality of lenses mounted for rotation with respect to said housing permitting alignment in sequence of said lenses with said aperture as said turret is rotated, means to fix alternatively said turret into a plurality of positions, each position aligning a lens with said aperture, reversible electric motor means selectively operable for a predetermined period to rotate said turret between positions, locking means including a locking element biased into and secured in a locking condition in response to terminal rotation of said motor means to lock said turret into its fixed position, switch means for initiating operation of said motor means, and means responsive to closing of said switch means to reverse temporarily said motor means to unlock said turret by releasing said locking means, to unfix said turret from its position, and subsequently to energize said motor means to drive said turret to the next said position.

5. Camera apparatus comprising a housing having an aperture, a turret carrying a plurality of lenses mounted for rotation with respect to said housing and permitting alignment in sequence of said lenses with said aperture as said turret is rotated, means alternatively fixing said turret into each of a plurality of positions, each position aligning a lens with said aperture, drive means including reversible motor means operable for a predetermined period to rotate said turret between positions, locking means incorporated in said drive means including a resilient element biased into and securing in a locking condition in response to terminal rotation of said motor means for locking said turret into its fixed position, switch means for initiating operation of said motor means, and means responsive to closing of said switch means for initially momentarily reversing said motor means to release said locking means, unfixing said turret from its position, and energizing said motor means to rotate said turret to the next position where said fixing and locking means automatically fix and lock said turret.

6. Camera apparatus comprising a housing having an aperture, a turret carrying a plurality of lenses mounted for rotation with respect to said housing and permitting alignment in sequence of said lenses with said aperture as said turret is rotated, means to catch said turret in any one of a plurality of positions, each position aligning a lens with said aperture, said catch means comprising a plurality of slots spaced on said turret, one for each of said lens positions, and means biased into engagement with each of said slots for catching said turret, drive means including reversible motor means operable for a predetermined period to rotate said turret between positions and lock means for locking said turret in each position including a resilient element biased into locking condition in response to terminal rotation of said motor means and restraining means operated by said motor means for maintaining said resilient element biased, switch means for initiating operation of said motor means, lifting means operable upon energization thereof for lifting said biased means out of engagement with a slot, and means responsive to closing of said switch means for momentarily reversing said motor means to displace said restraining means and thereby unbias said resilient element to release said lock means, energizing said lifting means, and energizing said motor means to rotate said turret to the next position where said biased means becomes engaged with the slot for said next position following the opening of said switch means to deenergize said lifting means.

References Cited in the file of this patent

UNITED STATES PATENTS

| | | |
|---|---|---|
| 1,626,032 | Fairchild | Apr. 26, 1927 |
| 1,653,995 | English | Dec. 27, 1927 |
| 1,893,327 | Howell | Jan. 3, 1933 |
| 2,135,506 | Hansch et al. | Nov. 8, 1938 |
| 2,635,514 | Roe | Apr. 21, 1953 |
| 2,694,352 | Babbs | Nov. 16, 1954 |
| 2,717,544 | Messenger et al. | Sept. 13, 1955 |

UNITED STATES PATENT OFFICE
CERTIFICATE OF CORRECTION

Patent No. 2,888,869                                             June 2, 1959

Jacob Katzen et al

It is hereby certified that error appears in the printed specification of the above numbered patent requiring correction and that the said Letters Patent should read as corrected below.

Column 2, line 18, for "index" read -- indexed --; column 4, line 42, for "and turret" read -- said turret --.

Signed and sealed this 12th day of April 1960.

(SEAL)
Attest:

KARL H. AXLINE
Attesting Officer

ROBERT C. WATSON
Commissioner of Patents